United States Patent [19]

Kaneda et al.

[11] Patent Number: 5,689,147
[45] Date of Patent: Nov. 18, 1997

[54] BRUSHLESS MOTOR

[75] Inventors: Isao Kaneda, Moriyama; Masanobu Chuta, Omihachiman; Tetsuya Tsuji, Shiga-ken, all of Japan

[73] Assignee: Nidec Corporation, Kyoto, Japan

[21] Appl. No.: 383,813

[22] Filed: Feb. 6, 1995

[30] Foreign Application Priority Data

Feb. 7, 1994 [JP] Japan ..................... 6-035325
Feb. 22, 1994 [JP] Japan ..................... 6-049897

[51] Int. Cl.⁶ ........................................ H02K 1/16
[52] U.S. Cl. ................. 310/216; 310/254; 310/156
[58] Field of Search ....................... 310/41, 68 B, 310/68 R, 156, 162, 268, 269, 254, 216; 318/254

[56] References Cited

U.S. PATENT DOCUMENTS

| | | |
|---|---|---|
| 4,099,104 | 7/1978 | Muller .................. 318/138 |
| 4,427,462 | 1/1984 | Senno et al. ............. 310/216 X |
| 4,531,079 | 7/1985 | Müller .................. 318/254 |
| 4,547,714 | 10/1985 | Müller .................. 318/254 |
| 4,672,252 | 6/1987 | Spirk ................... 310/216 |
| 4,737,674 | 4/1988 | Miyao ................... 310/268 |
| 4,804,873 | 2/1989 | Shiraki et al. .......... 310/67 R |
| 4,990,809 | 2/1991 | Artus et al. ............ 310/192 |
| 5,382,853 | 1/1995 | von der Heide et al. ... 310/67 R |
| 5,554,902 | 9/1996 | Kessens et al. .......... 310/254 |

Primary Examiner—Steven L. Stephan
Assistant Examiner—Judson H. Jones
Attorney, Agent, or Firm—McCormick, Paulding & Huber

[57] ABSTRACT

A brushless motor comprising a stator core having a plurality of tooth portions disposed peripherally at intervals, coils wound in a required manner on a plurality of tooth portions, an annular rotor magnet disposed in opposition to the stator core and having N poles and S poles alternately disposed, and a position detecting sensor for detecting the rotating angular position of the rotor magnet. The stator core is formed by laminating an anisotropic steel sheet in which the easily magnetizable axis of the crystal is in a specific direction.

16 Claims, 10 Drawing Sheets

BRUSHLESS MOTOR

FIELD OF THE INVENTION

The present invention relates to a brushless motor which can be conveniently applied to a spindle motor or the like.

DESCRIPTION OF THE PRIOR ART

Generally, the brushless motor such as a spindle motor is provided with a stator and a rotor relatively rotatable with respect to the stator. This stator has a stator core formed by laminating a plurality of core plates, and the stator core is provided with a plurality of tooth portions at peripheral intervals. The tooth portion of the stator core has a coil wound in a required manner. In the case of a three-phase motor, two coils are wound on the tooth portions. A rotor magnet is mounted on the rotor, and an N pole and an S pole are disposed alternately in the rotor magnet. Furthermore, a position detecting sensor for detecting the rotational angle position of the rotor magnet is provided, and a driving current to be supplied to the coil based on the detection signal from the position detecting sensor is controlled.

In the three-phase motor of this type, current passing to three coils should be switched off, and there is a defect of requiring complicated control means. Furthermore, since a current is supplied to a part of the three coils (in the case of a bipolar driving, two coils), the utilization efficiency to the coils is low and it is difficult to obtain a large torque.

On the other hand, in a two-phase motor of this type, a dead point (the position at which the motor does not start) occurs depending upon the relation of relative position between the rotor and the stator, and when the rotor stops at the dead point, poor starting occurs. To prevent this poor starting, an improvement must be made by providing an auxiliary pole in the stator core in addition to the tooth portion, or by changing the shape of the forward end portion of the tooth portion in a peripheral direction. Thus, the construction of the machine becomes complicated.

SUMMARY OF THE INVENTION

It is an object of this invention to provide a brushless motor capable of obtaining a large rotating torque with a relatively simple construction.

It is another object of this invention to provide a brushless motor whose starting properties can be markedly increased with a relatively simple construction.

It is still another object of this invention to provide a brushless motor which is relatively low in cost and has a high efficiency.

The other objects and characteristics of this invention will be easily understood from the following description.

BRIEF DESCRIPTION OF THE DRAWINGS

FIGS. 9-A and 9-B are brief views each showing the stopping position of the rotor magnet in the motor of FIG. 7.

DETAILED DESCRIPTION OF THE PREFERRED EMBODIMENTS

The invention will be described in detail with reference to the accompanying drawings.

FIRST SPECIFIC EXAMPLE

Figure 1:
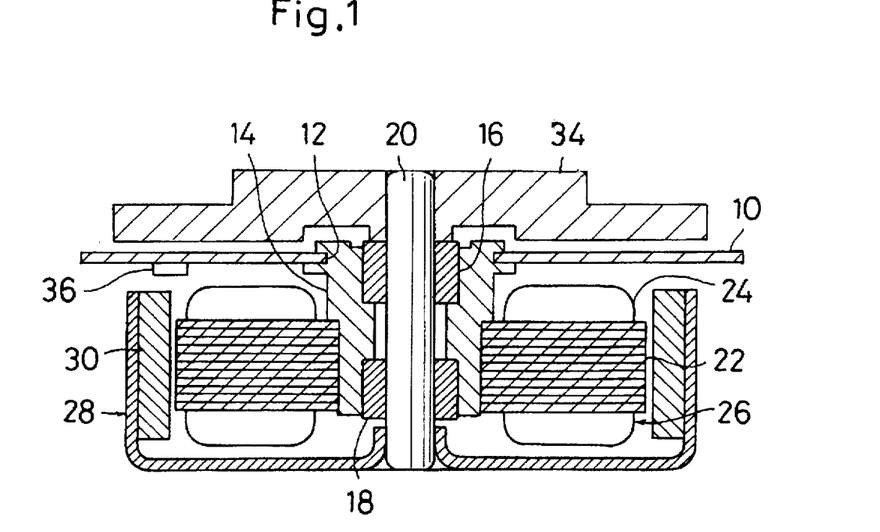
FIG. 1 is a sectional view of the principal parts of a first specific example of the brushless motor in accordance with the present invention.

FIG. 1 shows a first specific example of the brushless motor in accordance with the present invention, and this first specific example applies to a motor rotating and driving a recording medium which is CD-ROM.

In FIG. 1, the depicted motor is provided with a substrate plate 10 formed from a silicon steel sheet, etc., and this substrate plate 10 is fixed to a housing of a driving apparatus. A fixing hole 12 is formed in the substrate plate 10, and a cylindrical sleeve 14 will be fixed to the fixing hole 12. The cylindrical sleeve 14 is fixed to the substrate plate 12 and extends downwardly from one end portion fixed to the substrate plate 10. Sleeve bearings 16 and 18 are mounted on both end portions of the cylindrical sleeve, and via the sleeve bearings 16 and 18, a shaft 20 is rotatably supported. The sleeve bearings 16 and 18 can be constructed of oil-containing bearings known per se.

A stator 26 is fixed to the outer peripheral surface of a sleeve 14. One end portion of a shaft 20 projects upwardly from the one sleeve bearing 16, and a turntable 34 is fixed to the upper projecting end portion by, for example, penetration under pressure. The table 34 is positioned above the substrate plate 10, and a recording medium (not shown) is placed on the upper surface. Furthermore, the other end portion of the shaft 20 is projected downwardly from the other sleeve bearing 18, and a cup-like rotor 28 is fixed to this downwardly projecting end portion by a caulking, etc. The rotor 28 is disposed so as to surround a stator 26, and an annular rotor magnet 30 is fixed to the inner circumferential surface of a circular wall of the rotor 28. The rotor magnet 30 is opposed to the outer peripheral surface of the stator 26 with some space. The stator 26 and the rotor magnet 30 will be described later.

Figure 2:
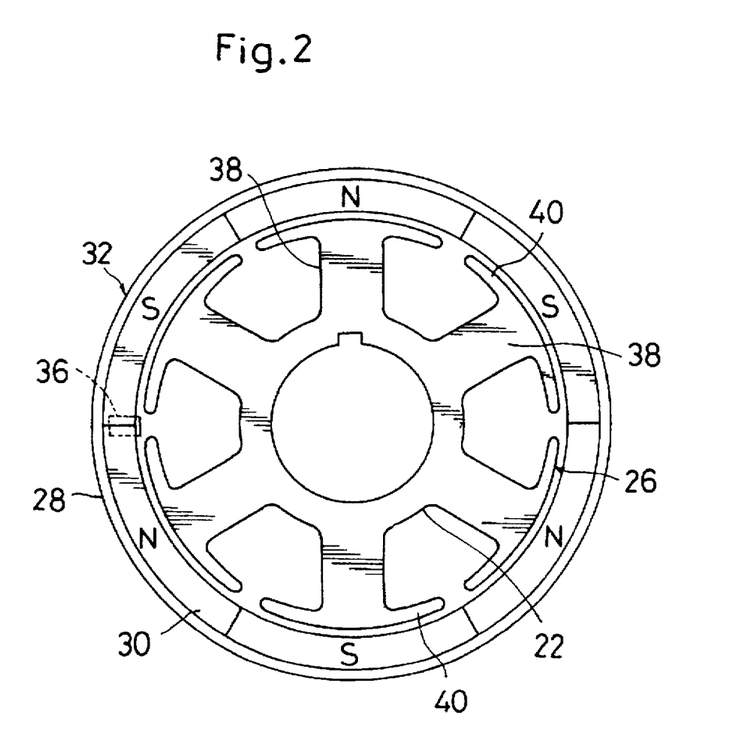
FIG. 2 is a top plan view showing the stator and the rotor of the brushless motor of FIG. 1.

FIG. 2 shows a relation between the stator 26 and the rotor 28 in the motor in the specific example. In FIG. 2, a coil 24 is omitted.

A stator core 22 of the stator 26 is formed by laminating isotropic or anisotropic silicon steels. Six slots are formed in the stator core 22, and a tooth portion 38 is formed by these slots. The six tooth portions 38 are disposed peripherally at substantially equal distances, and an intermediate portion of these extends radially outwardly. In the forward end portion of these, a tip 40 projecting peripherally is provided. A coil means is wound about the intermediate portion of each tooth portion 38. The coil means is constructed of a single phase coil 24 (substantially one coil), and the coil 24 is wound so that the winding direction of each adjoining tooths 38 may be in an inverse direction. Accordingly, when an electric current is applied to the coil 24, the tip 40 of each of the adjoining teeth portions 88 will be magnetized in an inverse polarity. When an anisotropic material is used as the stator core 22, the starting characteristic can be markedly increased for the reason to be mentioned below.

On the other hand, the number of poles of a rotor magnet 80 is six which is the same as the number of the tooth portions 38 of the stator core 22. In the peripheral direction, N poles and S poles are alternatively arranged. These magnetic poles have substantially the same angle which is adjusted to 60 degrees in the specific example.

A position detecting sensor 36 is provided to detect the rotating angular position of the rotor magnet 30. The detecting sensor 36 can be constructed of a Hall element, for example, and is provided in the under surface of the substrate plate 10 (see FIG. 1). This position detecting sensor 36 is provided at a position which is intermediate between adjoining tooth portions 38 and which is opposite to the rotor magnet 30. A detection signal from this detection sensor 36 is supplied to a control means 42 (to be described later) and controls the supply of a current to the coil 24 based on the rotating angular position of the rotor magnet 30.

Figure 3:
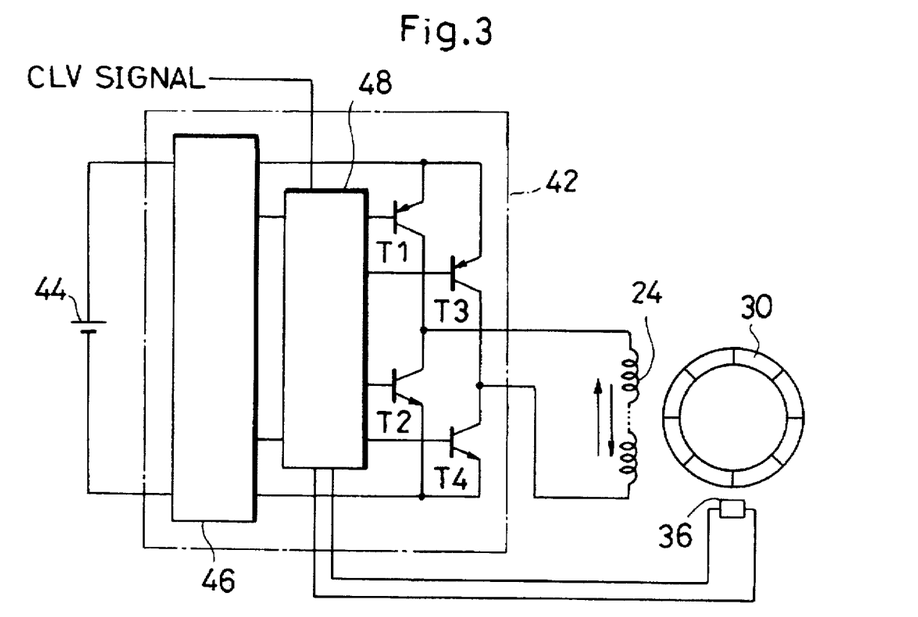
FIG. 3 is a circuit diagram showing a driving circuit of the brushless motor of FIG. 1.

FIG. 3 illustrates a driving circuit of the motor. The illustrated driving circuit has a control means 42, and the control means 42 is constructed of a power source controlling portion 46 which is connected to a direct current power source 44 and supplies a direct current to the coil 24 and a current controlling portion 48 which performs a switching controlling of a switching element, for example, transistors T1 to T4.

Figure 4:
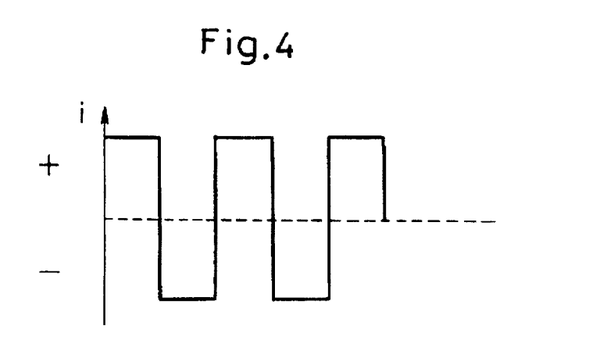
FIG. 4 is a waveform diagram showing the waveform of a current supplied to a coil of the brushless motor of FIG. 1.
Figure 5:
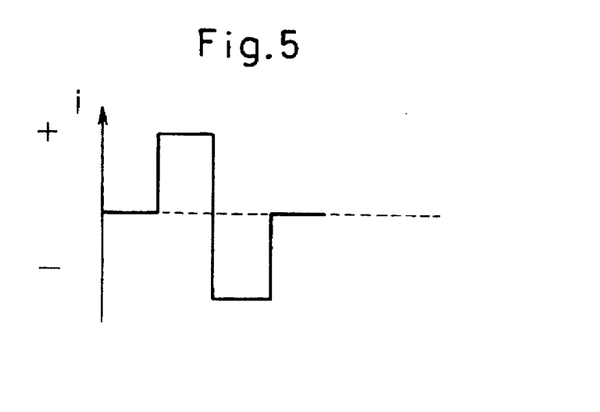
FIG. 5 is a waveform diagram showing a modified example of the waveform of a current.

This power source controlling portion 46 controls an electric current to be supplied to the coil 24 by a CLV signal at the time of reproducing CD (a signal for predetermining the angular speed of a position of reading the signal of a recording medium) and controls the rotating speed of the rotor 28. Furthermore, the current controlling portion 48, as shown in FIG. 4, does not substantially have a posing period and supplies a current to the coil 24 by application of an electric current in both ways in which the current applying direction is inverted. By this application of the current, each tooth portion 38 of the stator core 22 is excited by using the detection signal of the sensor 36 so that each tooth portion 38 becomes an inverted polarity to the counter magnetic pole of the rotor magnet 38.

In this motor, when the coil 24 of the stator 26 is driven by the control means 42, each tooth portion 38 of the stator core 22 is magnetized so that the adjoining tips 40 will become different poles.

When the stator core 22 is formed of an isotropic material, each pole of the rotor magnet 30 is opposed to each tip 40 of the stator core 22 at the time of stopping the rotor 28. Accordingly, at the time of starting, the stator 26 and the rotor 28 form a so-called dead point and starting is considered to fail. At the time of starting, one application of an electric current is selected by the hysterisis of the sensor 36, but actually, the difference of the wound condition of the coil 40 in each tooth portion 38 such as a difference in the shape of the tip 40 in each tooth portion 38 causes a difference in attractive and repulsive actions between magnetic poles of the tip 40 and the rotor magnet 30, and the rotor 28 begins to start.

In order to increase the starting reliability, it is preferable to provide a posing period after a driving current is supplied through, for example, one cycle. The posing period may be adjusted to, for example, about 5 to 50 ms. By providing the posing period in this manner, vibration occurs in the rotor magnet 30. This vibration and again the driving current are supplied to the coil 24 to elevate the starting torque of the rotor 28. As a result, the starting characteristics of the motor are markedly improved. The posing period may be provided after the driving current of at least 2 cycles is supplied.

When the rotor 28 rotates, the rotating angular position of the rotor magnet 30 is detected by the detecting sensor 36. This detecting signal switches the current applying direction with respect of the coil 24, and an electric magnetic pole which has an opposite polarity to the counter magnetic pole of the rotor magnet 30 of the tip 40 of each tooth portion 38 is produced, whereby a rotating power is continuously applied to the rotor 28.

In this motor, since the rotating direction of the rotor 28 can be detected by using the detection signal of the sensor 36, even when the starting is performed in a direction inverse to the predetermined rotating direction, the rotating direction can be reversed by controlling the application of an electric current. This means that the rotating direction of the rotor 28 can be freely reversed. For example, the rotating direction of the motor can be reversed by reversing and switching off the detecion signal of the sensor 36.

In the specific example, the number of tooth portions 38 of the stator 26 is equalized to the number of magnetic poles of the rotor magnet 30. Accordingly, the above motor will act as a synchronized motor. In this motor, since a torque is developed between the tip 40 of each tooth portion 38 and each magnetic pole of the rotor manger 30 at the time of rotation, a rotating torque acting on the rotor 28 becomes very great.

In the illustrated specific example, the present invention has been described by applying to a motor of 6-pole 6-slot, but the present invention is not limited to the above embodiment. It may be applied to a motor having a stator with tooth portions in multiples of 2 and a rotor magnet having the same number of tooth portions. In this case, when the number of tooth portions becomes more, a mechanical angle between adjoining tips becomes smaller, whereby attractive and repulsive actions between each tip and each magnetic pole become greater.

SECOND SPECIFIC EXAMPLE

Figure 6:
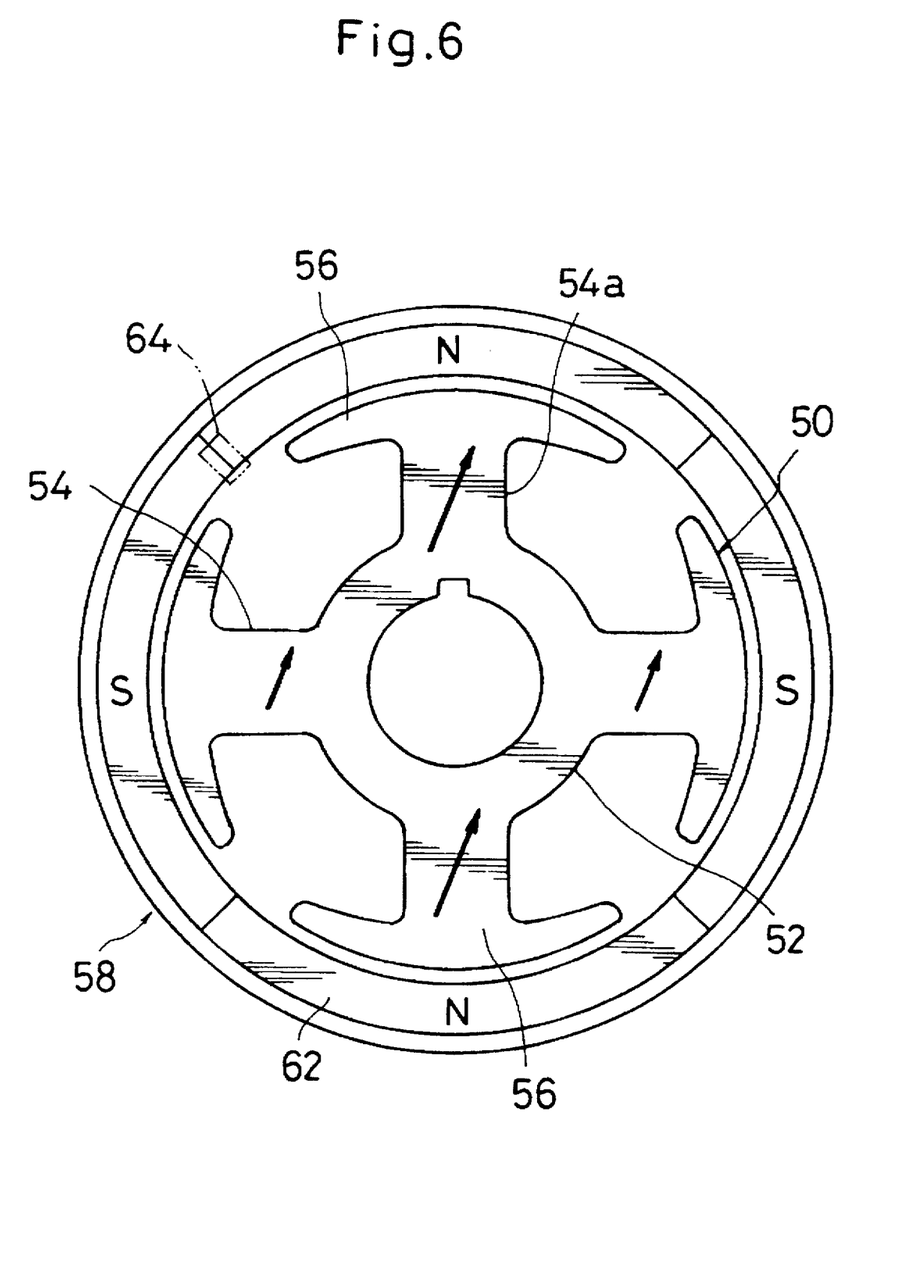
FIG. 6 is a top plan view briefly showing the stator and the rotor in a second specific example of the brushless motor in accordance with the invention.

FIG. 6 shows a second specific exmple of the brushless motor in accordance with the present invention. In this second specific example, a mechanical angle between adjoining tips in the stator core increases very greatly to about 18 degrees while the motor of 6 pole and 6 slot has this angle of about 8 degrees. Accordingly, an easily magnetizable axis is provided in a specific direction of the stator core to aim at improving the starting characteristics.

In FIG. 6, the stator core 52 of the stator 50 has 4 slots, and by four slots, four teeth 54 are aligned peripherally at equal intervals. This stator core 52 is made of an anisotropic silicon steel plate, and the easily magnetizable axis of the crystal in the steel sheet is deviated in about 10 degrees in a direction shown by an arrow in FIG. 6, namely with respect to a specific tooth portion 54a (a tooth portion extending upwardly in FIG. 6). A tip 54 is provided in the forward portion of each tooth portion 54. Each tooth portion 54 adjoining one coil is wound in a winding direction in a mutually reverse direction, and by applying an electric current to the coil, adjoining tips 56 are magnetized in reverse directions.

An annular rotor magnet 62 is mounted on the inner peripheral surface of the peripheral wall of the rotor 58 provided rotatably in opposition to the stator 50. The rotor magnet 62 has the same four magnetic poles which are the same as the number of the tooth portions 54 of the stator core 52. The sensor 64 disposed in opposition to the rotor magnet 62 is disposed between two specific adjoining tooth portions 54 of the stator core 52.

In the brushless motor of the second specific example, when a current to the coil is started, each tip 56 is magnetized. At this time, since the stator core 52 has an easily magnetizable characteristic in a specific direction, a magnetization center in each tip 56 is deviated from the center of the tip 56, and therefore, the center of each magnetic pole of the rotor magnet 62 is deviated from the relative positional relation of the center of magnetization, whereby a rotating force acts on the rotor magnet 62 and the rotor 58 rapidly rotates.

When the rotor 58 begins to rotate, the rotating angular position of the rotor magnet 62 is detected by the sensor 64. This detection signal switches off the current applying direction to the coil, and each tip 56 forms a electromagnetic pole which has a reverse polarity with respect to a counter magnetic pole, whereby a rotating force is applied continuously to the rotor 58.

THIRD SPECIFIC EXAMPLE

Figure 7:
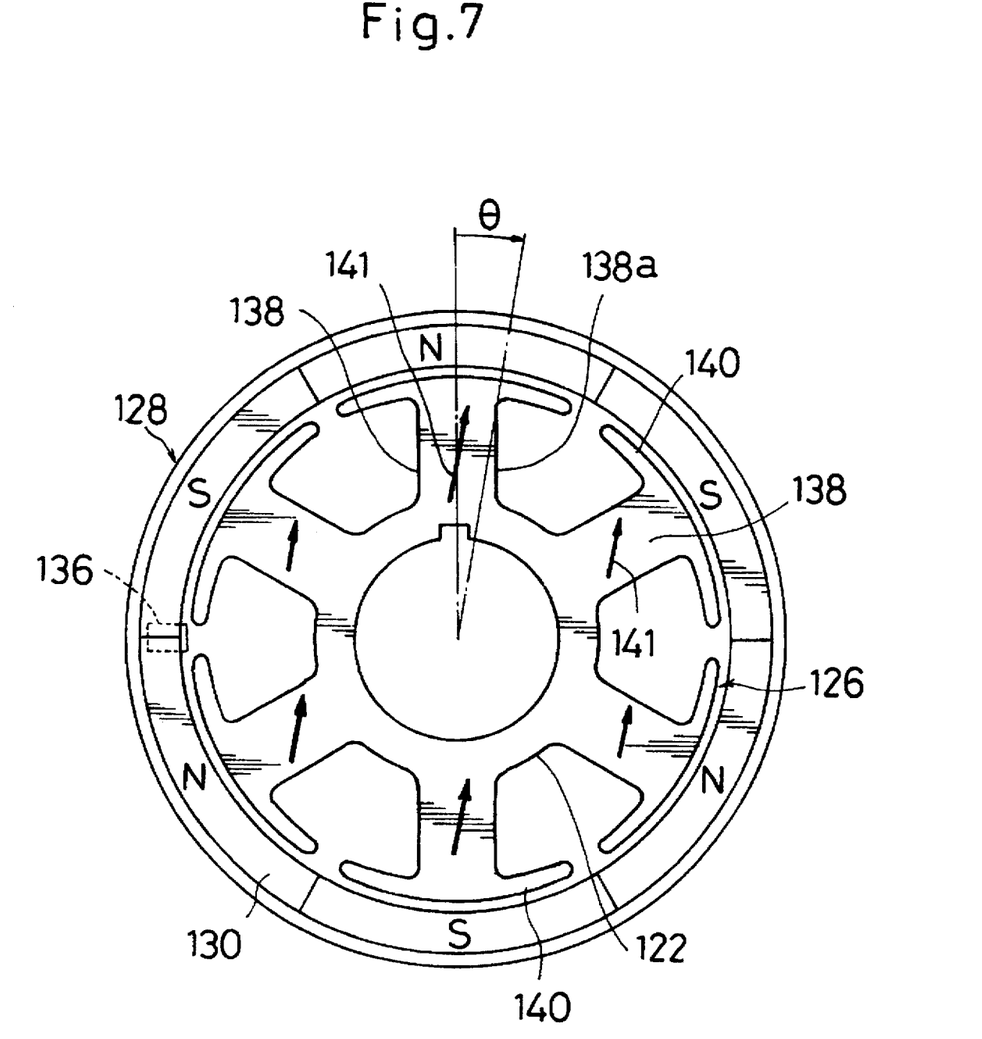
FIG. 7 is a top plan view briefly showing the stator and the rotor in a third specific example of the brushless motor in accordance with the invention.

FIG. 7 shows a third specific example of the brushless motor in accordance with the present invention.

In FIG. 7, the illustrated motor is provided with a stator 126 and a rotor 128 which are relatively rotatable.

The stator core 122 of the stator 126 is formed by laminating an anisotropic silicon steel plate. Six slots are formed in the stator core 122, and by these slots, tooth portions 138 are formed.

Six tooth portions 138 are disposed peripherally at substantially equal intervals, and their intermediate portion extends radially outwardly. At their forward end portion, the tip 40 projecting peripherally is provided. At the intermediate portion of each tooth portion 138, a coil means is wound. The coil means is constructed of a single phase coil (not shown) (substantially one coil), and in the coil, adjoining tooth portions 138 are wound in such a manner that the winding direction is in an inverse direction. Accordingly, when a current is supplied to the coil, the adjoining tips 140 of the adjoining tooth portions 138 are magnetized respectively in a reverse magnetic pole.

This stator core 122 has an easily magnetizable axis in the direction shown by an arrow 138. The stator core 122 may be formed by laminating a plurality of core plates having an easily magnetizable axis which is deviated by an angle of θ degrees in the clockwise direction with a specified tooth portion 138a as a standard. The deviating angle of θ degrees is about 10 degrees in this specific example. It can be predetermined to be an angle of 0 to 22.5 degrees.

On the other hand, the number of magnetic poles of the rotor magnet is 6 which is the same as the number of tooth portions 138 of the stator core 122, and N poles and S poles are alternatively arranged peripherally. The angles of these magnetic poles are subtantially the same, and in the specific example, they are predetermined to be 60 degrees.

A position detecting sensor 136 is provided to detect the rotating angular position of the rotor magnet 130. The detecting sensor 136 can be constructed of a Hall element, for example, and can be provided at the under surface of the substrate plate (not shown) as is the same as in the first specific example. This position detecting sensor 136 is disposed in an intermediate portion of adjoining tooth portions 138 and at a position opposite to the rotor magnet 130. A detection signal from this detection sensor 136 is supplied to the control means, and the control means controls the supply of a current to the coil based on the rotating angular position of the rotor magnet 130. The application of a current to the coil by the control means may be performed in the same way as in the first specific example.

In the motor of such a specific example, when the coil of the stator 126 is driven, each tooth portion 138 of the stator core 122 is magnetized so that the adjoining tips 40 may become different poles.

Figure 8:
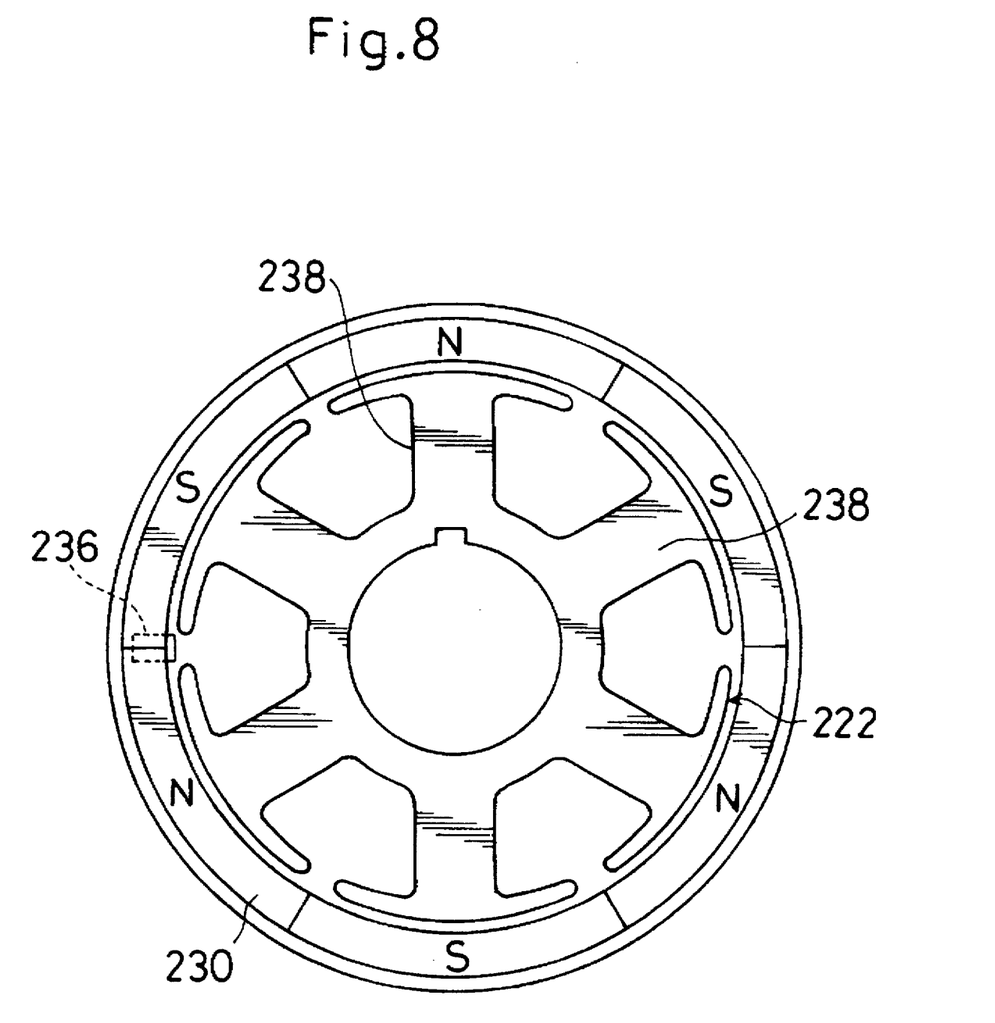
FIG. 8 is a brief view showing the stopping position of the rotor magnet when a stator core having isotropic characteristics is used.

Generally, when the stator core 222 formed by laminating an isotropic core plate is used, the stator core 222 and the rotor magnet 230 are held in the positional relationship illustrated as shown in FIG. 8. Since the number of magnetic poles is the same in the tooth portion 238 of the stator core 222 and the rotor magnet 230, both are held at an angular position (the angular position shown in FIG. 8) at which the center of each tooth portion 238 coincides with the center of each magnetic pole. Accordingly, the detection signal from the position detecting sensor 236 does not substantially exist at this angular position, and in the case of a single phase coil, the starting of the motor becomes difficult.

Figure 9:
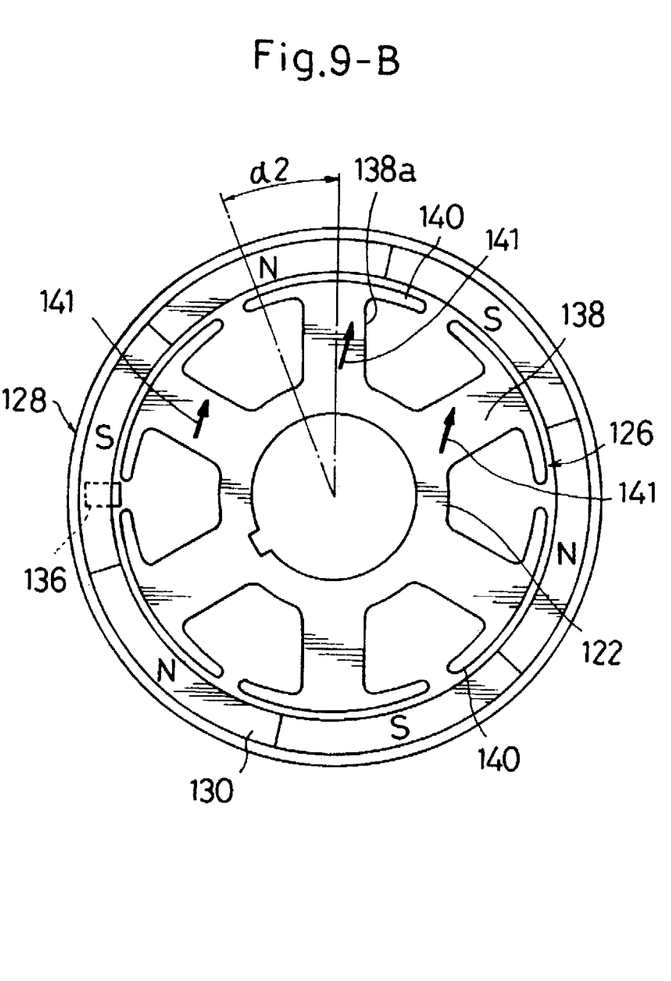

On the other hand, in the motor of this specific example, since at the time of stoppage of the rotor 128, the stator core 122 has an easily magnetizable characteristic in the direction shown in an arrow 138, the stator 122 and the rotor magnet 130 are held in the positional relation shown by FIG. 9-A or 9-B. When the isotropic stator core 122 is used instead of the isotropic stator core 222, the stator core 122 and the rotor magnet 130 are held in the positional relation shown in FIG. 9-A or 9-B (in FIG. 9-A or 9-B, an N pole is opposed to a specific tooth portion 138a, but an S pole may be opposed to a specified tooth portion 138a) instead of the positional relation shown in FIG. 8. In the first positional relation shown in FIG. 9-A, the rotor magnet 130 relatively moves clockwise at an angle of α1 (in the specific example, it is about 15 degrees) as compared with the positional relation shown in FIG. 8, and furthermore, the rotor magnet 130 moves relatively counterclockwise at an angle of α2 (in the specific example, it is about 15 degrees) as compared with the positional relation shown in FIG. 8. When an easily magnetizable axis of the crystal of the core plate constituting the stator core 122 exists as shown above, the magnetic flux tends to flow in the direction of the easily magnetizable axis, magnetic saturation is difficult to form and much magnetic force flows. As a result, the rotor magnet 130 at a stopping condition comes to a halt in the first or second positional relation.

When the stator core 122 is magnetized at the time of starting by applying a current to the coil, the center of magnetization in each tip 140 is deviated greatly from the center of the tip 140. Accordingly, the center of each magnetic pole of the rotor magnet 130 is deviated from the center of magnetization of each tip 140, and a rotating force based on the deviation angle acts on the rotor magnet 130. Furthemore, since the rotor magnet 130 at stoppage is in the positional relation shown by FIG. 9-A or 9-B, the position detecting sensor 136 outputs a predetermined detection signal, and a driving current is supplied to the coil based on such a detection signal. When the anisotropic stator core 122 is used, the starting of the rotor 128 becomes sure and the starting characteristic is markedly increased.

When the rotor 128 is started, the rotating angular position of the rotor magnet 130 is detected, and this detection signal switches off the current applying direction to the coil. An electromagnetic pole which has inverse polarity to the counter magnetic pole of the rotor magnet 130 is formed in each tip 140, and a rotating force is given continuously to the rotor 32.

In the motor of the specific example, the number of tooth portions 138 of the stator 126 is equal to the number of magnetic poles of the rotor magnet 130 whereby the above motor acts as a sychronized motor. Since during rotation, a torque occurs between the tip 140 of each tooth portion 138 and each magnetic pole of the rotor magnet 130, a rotating torque acting on the entire rotor 128 becomes very great.

FOURTH SPECIFIC EXAMPLE

Figure 10:
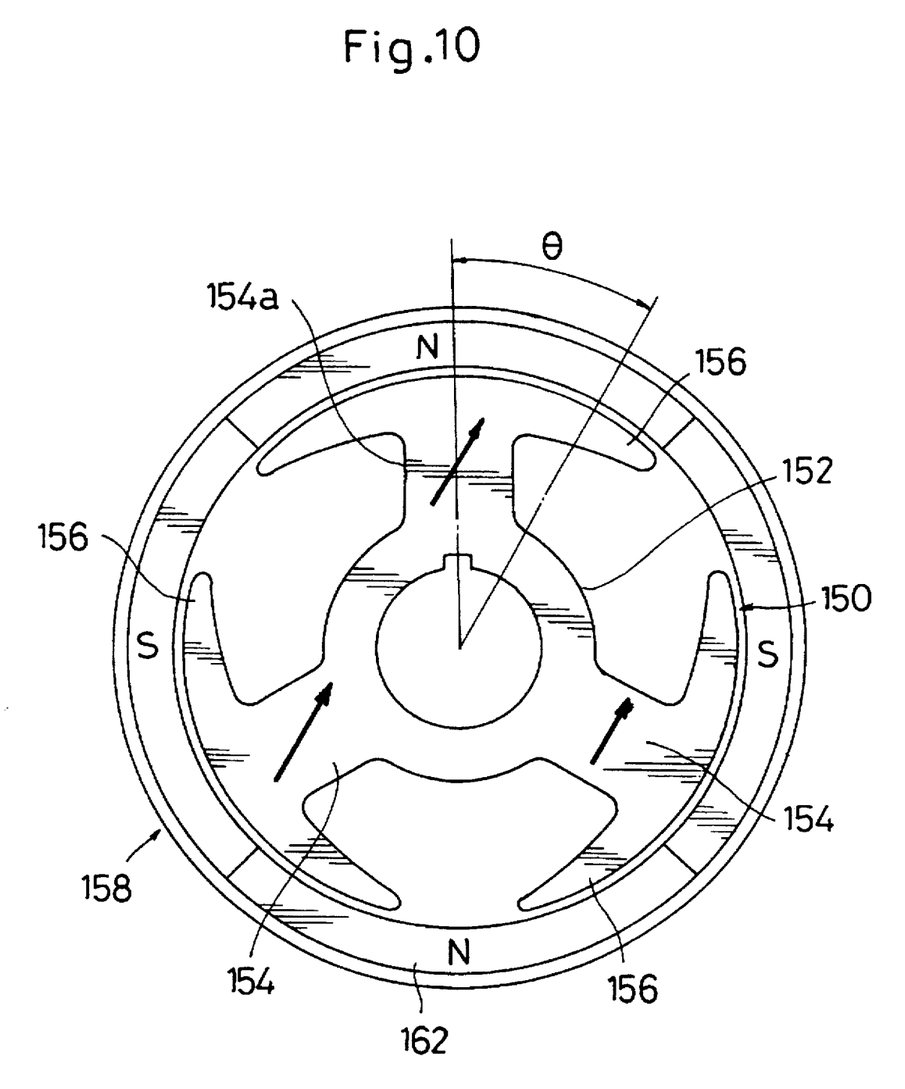
FIG. 10 is a top plan view briefly showing the stator and the rotor in a fourth specific example of the brushless motor in accordance with this invention.

FIG. 10 shows a fourth specific example of the brushless motor in accordance with the present invention. In the fourth specific example, the stator core 152 of the stator 150 has three tooth portions, and the three tooth portions 154 are arranged peripherally at substantially equal intervals, namely at every 120 degrees. This stator core 152 is composed of a one-directional silicon steel plate, and the easily magnetizable axis of the crystal in the steel plate is deviated at a machine angle θ of, for example, 20 degrees with respect to a specified tooth portion 154a as shown by an arrow in FIG. 10. A tip 156 is provided at the forward end of each tooth portion 154. Furthermore, in each tooth portion 154, a single phase coil (not shown), for example, is sequentially wound.

On the other hand, an annular rotor magnet 162 is mounted on the inner peripheral surface of the peripheral wall of the rotor 158 provided rotatably so as to oppose to the stator 150. The rotor magnet 162 is composed of 4 poles, and two N poles and two S poles are peripherally arranged at equal intervals. A position detecting sensor (not shown) such as a Hall element is disposed in opposition to the rotor magnet 162.

When at the time of starting, the application of a current to the coil is started and each tip 156 is magnetized, since the stator core 152 has directionality in an easily magnetizable direction, the center of magnetization in each tip 156 is deviated from the center of each tip 156. Accordingly, the center of each magnetic pole of the rotor magnet 162 is deviated from the center of magnetization of each tip 156, whereby a rotational force in a predetermined direction acts on the rotor magnet 130, and the rotor 158 rapidly rotates.

When the rotor 158 begins to rotate, the rotational angular position of the rotor magnet 162 is detected by the sensor. This detection signal switches off the current applying direction to the coil and a rotational force is imparted continuously to the rotor 158.

FIFTH SPECIFIC EXAMPLE

Figure 11:
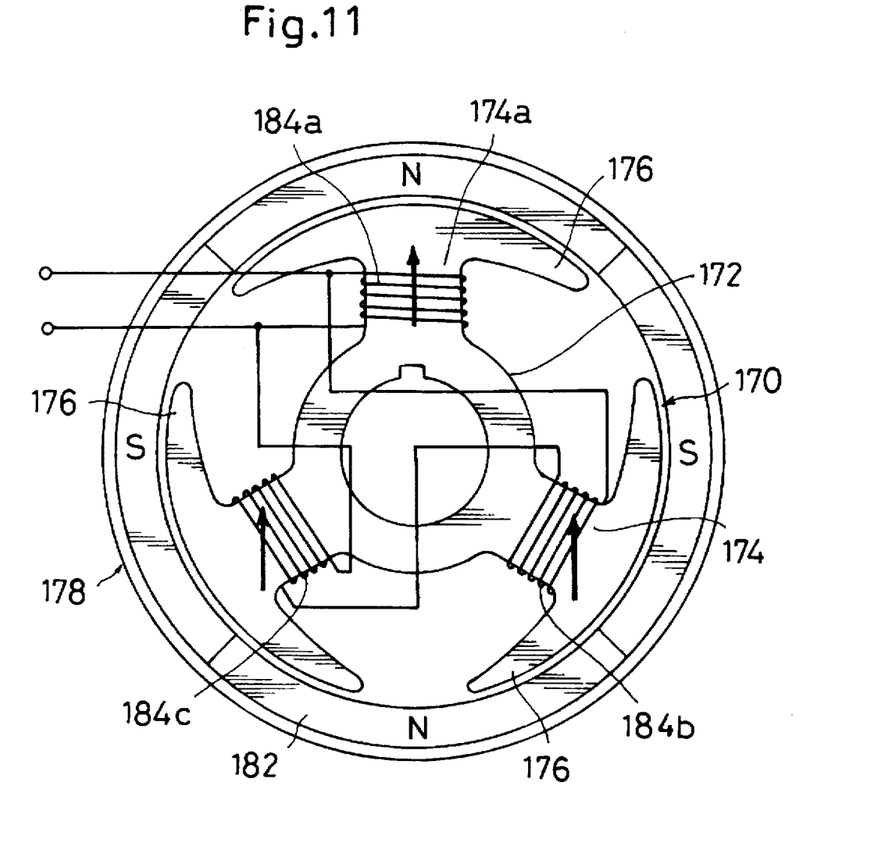
FIG. 11 is a top plan view briefly showing the stator and the rotor of a fifth specific example in accordance with this invention.

FIG. 11 shows a fifth specific example of the brushless motor in accordance with the present invention. This specific example, same as in the fourth specific example, shows an example to which a brushless motor of 4-pole 3-slot is applied. The stator core 172 of the stator 170 is composed of three slots, and three tooth portions 174 are arranged peripherally at substantially equal intervals, namely at every 120 degrees. This stator core 172 can be formed of a one-directional silicon steel plate or an electromagnetic steel plate. As shown by an arrow in FIG. 11, the easily magnetizable axis in the crystal of the steel plate coincides with the projecting direction with respect to a specified tooth portion 174a. Therefore, the easily magnetizable axis in the crystal has a deviation angle of +120 degrees and −120 degrees in the projecting direction of other two tooth portions 174. A tip 176 is provided in the forward end of each tooth portion 174.

On the other hand, an annular rotor magnet 182 is mounted on the inner surface of the peripheral wall of a rotor 178 provided rotatably to oppose to the stator 170 has an annular rotor magnet 182 mounted on the inner surface of the peripheral wall of a rotor holder 80. The rotor magnet 182 is composed of four poles, and N poles and S poles are alternately arranged peripherally at equal intervals. A position detecting sensor (not shown) is disposed in opposition to the rotor magnet 182.

Figure 12:
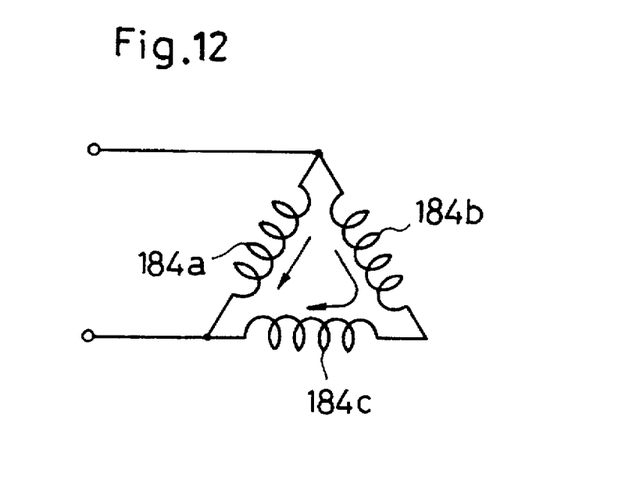
FIG. 12 is a view for explaining a current supplied to a coil of the motor of FIG. 11.

Furthermore, the individual tooth portions 174 of the stator core 172 have respectively coils 184a, 184b, and 184c wound thereon. The coil 184a wound on a specified tooth portion 174a and the coils 184b and 184c wound on two other teeth 174 have a winding direction so that the polarities of the generating magnetic poles at the time of applying a current to the coils are different. As shown in FIG. 12, a series circuit of the coil 184a and a series circuit of the coils 184b and 184c are connected in parallel to each other, and this parallel circuit network is driven by one power source.

In this specific example, the projecting direction of a specified tooth portion 174a on which a coil 184a is wound coincides with an easily magnetizable axis. In other teeth 174 on which the other coils 184b and 184c connected in series are wound, their projecting direction has an angle of 120 degrees to an easily magnetizable axis. Accordingly, a magnetic flux generated in a specified tooth portion 174 becomes about twice the magnetic flux generated in another tooth portion 174. In other words, the generation of Joule heat through the coil 184a of a specified tooth portion 174a becomes a half of that generated through the coils 184b and 184c of the tooth portions 174 whereby the current flowing through the coil 184a becomes ½ of the current flowing through the other coils 184b and 184c.

At the time of stoppage of the rotor 178, each magnetic pole of the rotor magnet 182 and each tip of the stator core 172 are balanced magnetically, and it is considered that the stator 170 and the rotor 178 form a so-called dead point and fails to start at the time of starting. On the other hand, in the motor of this specific example, the number of poles of the rotor magnet 182 is different from the number of tooth portions 174 of the stator 170, and furthermore, the stator core 172 has anisotropic characteristics. Accordingly, attractive and repulsive actions differ between each tip 178 of each tip 176 and each magnetic pole of the rotor magnet 182, and the rotor 178 begins to rotate.

When the rotor 178 begins to rotate, the rotating angular position of the rotor magnet 182 is detected by the detecting sensor. This detection signal switches off the current applying direction of the coils 184a, 184b and 184c, and therefore, an electromagnetic pole having an inverse polarity to a counter magnetic pole of the rotor magnet 182 is generated.

SIXTH SPECIFIC EXAMPLE

Figure 13:
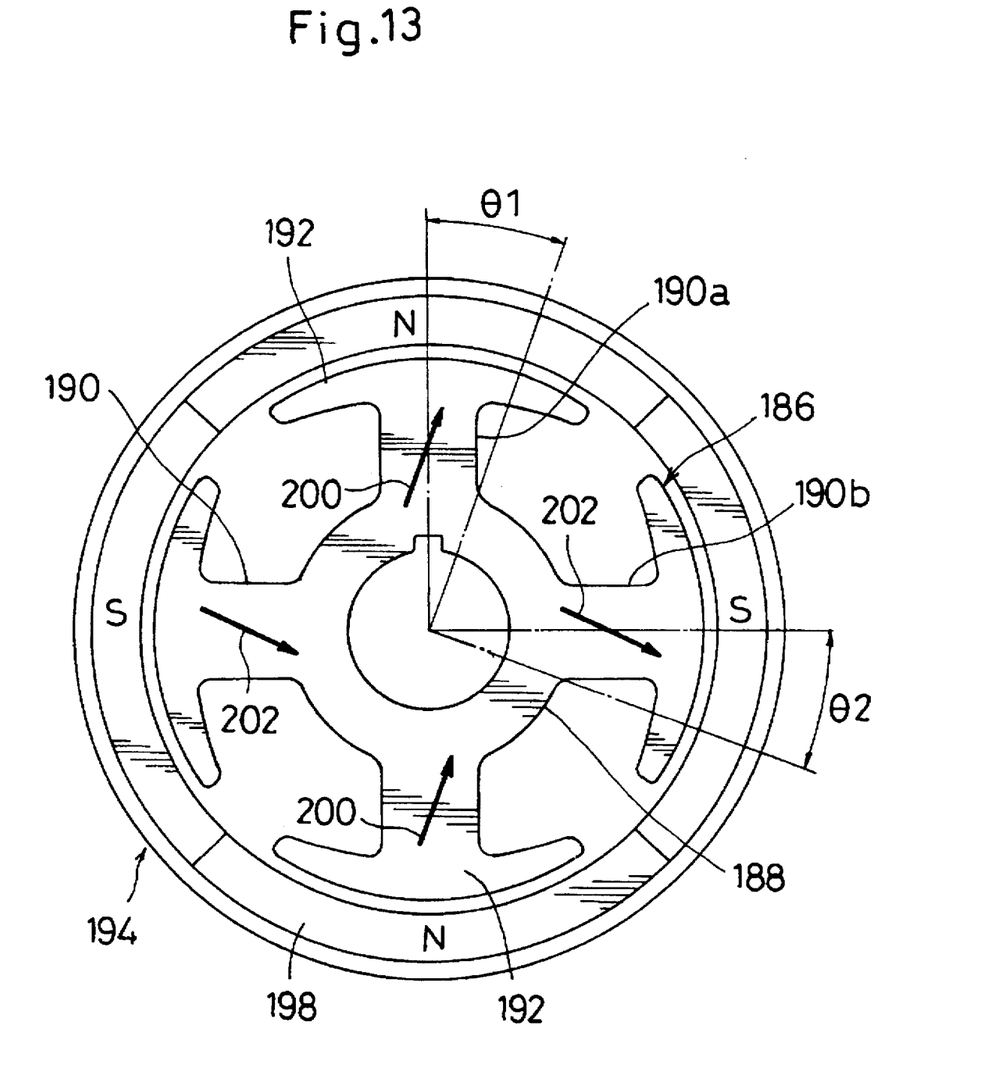
FIG. 13 is a top plan view briefly showing the stator and the rotor of a sixth specific example in accordance with this invention.

FIG. 13 shows the sixth specific example of the brushless motor in accordance with this invention. This sixth specific example shows an example of applying a brushless motor having 4 poles and 4 slots. The stator core 188 of the stator 186 has 4 slots, and four tooth portions 190 are arranged peripherally at substantially equal intervals, namely at every 90 degrees. In this stator core 188, an easily magnetizable axis extends in a first direction shown by an arrow 200 and a second direction shown by an arrow 202. The first direction is deviated by an angle θ1 clockwise with respect to a first specified tooth portion 190a (a tooth portion extending upwardly in FIG. 13). In the specific example, this angle θ1 is prescribed at 7 degrees. Furthermore, the second direction is deviated by an angle θ2 clockwise with respect to a second specified tooth portion 190b (a tooth portion extending to the right in FIG. 13), and in the specific example, this angle of θ2 is prescribed at 7 degrees. The easily magnetizable axis extending in the first direction and the easily magnetizable axis extending in the second direction substantailly cross each other at right angles. A tip 192 is provided at the forward end portion of each tooth portion. A single phase coil is wound on the tooth portion 190 in the same way as in the second specific example.

On the other hand, an annular rotor magnet 198 is mounted on the inner peripheral surface of the peripheral wall of the rotor 194 rotatably provided in opposition to the stator 186. The rotor magnet 198 contains 4 poles, and N poles and S poles are alternatively arranged peripherally at substantially equal intervals.

One position detecting sensor (not shown) is provided in the same manner as mentioned above in opposition to the rotor magnet 198.

In the motor using a stator 188 having two-way easily magnetizable axes, the starting characteristics can be increased in the same way as a motor having a single easily magnetizable axis.

Figure 14:
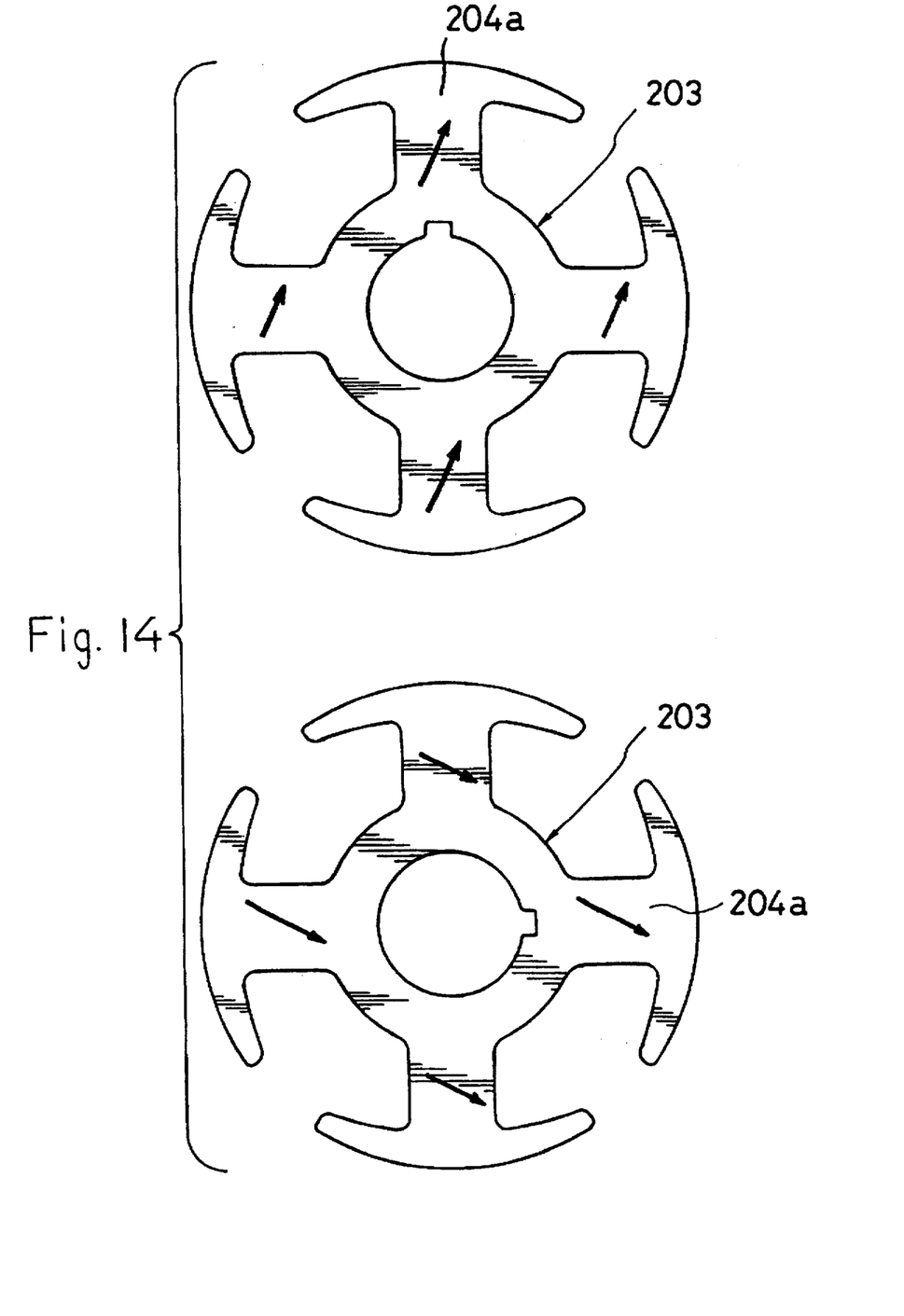
FIG. 14 is a brief perspective view for explaining the manner of laminating the stator core in the motor of FIG. 13.

The stator 188 having two-way easily magnetizable axes can be easily produced by making a combination as shown in FIG. 14, for example. A number of core plates 203 having an easily magnetizable axis extending in a direction shown by a arrow. Half portion of the core plates 203 so produced are positioned at an angular position (the angular position shown in the upper side of FIG. 14) at which the specified tooth portion 204a extends upwardly in FIG. 14, and the remaining half portions of the core plates 203 are positioned at an angular position (the angular position shown in the under side of FIG. 14) at which the specified tooth portion 204a extends rightwardly in FIG. 14. Thereafter, all of the core plates 203 are bonded simultaneously by calking or similar means. As can be easily understood, the so bonded stator core has two-way easily magnetizable axes.

The core plate having an easily magnetizable axis may be formed by cold rolling a steel plate such as a silicon steel plate or a highly magnetic steel plate, and thereafter punching the steel plats by punching processing into a predetermined shape. For example, when a core plate 203 shown in FIG. 14 is produced, the easily magnetizable axis of the crystal can be prescribed at, for example, 0 to 22.5 degrees with respect to a specified tooth portion 204a.

The stator core having two-way easily magnetizable axes is not formed by using the same king of core plates, but also by using two kinds of core plates having easily magnetizable axes in different directions. Namely, it may be produced by bonding a first anisotropic steel plate having an easily magnetizable axis extending in a specific direction and a second anisotropic steel plate having an easily magnetizable axis extending in a second direction different from the specific direction.

In the foregoing, we have explained various specific examples of brushless motors in accordance with the present invention. The present invention, however, is not limited to these specific examples, and various variations and modifications are possible without departing from the range of the present invention.

What is claimed is:

1. A brushless motor comprising a stator core having a plurality of tooth portions disposed at spaces in a peripheral direction, coil means wound in a required manner in the plurality of tooth portions, an annular rotor magnet disposed in opposition to the stator core and having N poles and S poles alternatively, and a position detecting sensor for detecting the rotating angular position of the rotor magnet, wherein the plurality of tooth portions are provided in the same number as the number of magnetic poles of the rotor magnet, the position detecting sensor is disposed among adjoining tooth portions of the plurality of tooth portions, the coil means are composed of a single-phase coil, and the coils are wound on the plurality of tooth portions so that the winding directions are alternatively opposite to each other, and the control means, based on the detection signal of the position detecting sensor, does not substantially contain a posing period, and switches off a current supplied to the coils.

2. A brushless motor of claim 1 wherein the plurality of tooth portions are disposed peripherally at substantially equal intervals, and their facing tooth portions are excited to an opposite polarity when a current is supplied to the coils.

3. A brushless motor of claim 1 wherein the stator core is formed of an anisotropic steel plate in which the easily magnetizable axis of the crystal is in a specific direction.

4. A brushless motor of claim 3 wherein the steel plate is an anisotropic silicon steel plate.

5. A brushless motor of claim 1 wherein the control means supplies a driving current to the coil for a predetermined period of time at the starting of the motor, then temporarily stops the supplying of the driven current, and by this stopping of supplying, vibration is imparted to the rotor magnet.

6. A brushless motor of claim 5 wherein the control means supplies a driven current of 1 cycle to the coil at the time of starting the motor, and thereafter, stops its supply.

7. A brushless motor comprising a stator core having a plurality of tooth portions disposed peripherally at spaced intervals, a coil means wound in a required manner on the plurality of tooth portions, an annular rotor magnet disposed in opposition to the stator core and having N poles and S poles disposed alternately, and a position detecting sensor for detecting the rotating angular position of the rotor magnet, wherein the stator core is formed by laminating an anistropic steel plate in which the easily magnetizable axis of the core is substantially in agreement with a specified tooth portion of the plurality of tooth portions.

8. A brushless motor of claim 7 wherein the anisotropic steel plate is an anisotropic silicon steel plate or an anisotropic electromagnetic steel plate.

9. A brushless motor of claim 7 wherein the anisotropic steel plate is formed by performing a cold rolling the steel sheet in a direction of the easily magnetizable axis.

10. A brushless motor of claim 7 wherein the easily magnetizable axis of the stator core is inclined at an angle of 0 to 22.5 degrees to a specific tooth portion of the plurality of tooth portions.

11. A brushless motor of claim 7 wherein the plurality of tooth portions are provided in the same number as the number of magnetic poles of the rotor magnet.

12. A brushless motor of claim 11 wherein the number of magnetic poles of the rotor magnet is 4 or 6.

13. A brushless motor of claim 7 wherein the coil means is composed of a single-phase coil, and the coil is wound on the plurality of tooth portions so that the winding directions are alternately opposite.

14. A brushless motor of claim 7 wherein the stator core has two easily magnetizable axes in a specific direction and a second direction different from the specific direction.

15. A brushless motor of claim 14 wherein the stator core is formed by laminating anisotropic steel sheets of the same type in which the easily magnetizable axes are in the same specific directions while overlapping a first angular position and a second angular position.

16. A brushless motor of claim 14 wherein the stator core is formed by laminating a first anisotropic steel plate in which the easily magnetizable axis is in the specified direction and a second anisotropic steel plate in which the easily magnetizable axis is in the second direction different from the specific direction.

* * * * *